United States Patent
Lundström et al.

(10) Patent No.: US 7,869,373 B2
(45) Date of Patent: Jan. 11, 2011

(54) HIGH-AVAILABILITY NETWORK SYSTEMS

(75) Inventors: Magnus Lundström, Johanneshov (SE); Andreas Öman, Bagarmossen (SE); Tomas Skäre, Handen (SE)

(73) Assignee: PacketFront Systems AB, Kista (SE)

( * ) Notice: Subject to any disclaimer, the term of this patent is extended or adjusted under 35 U.S.C. 154(b) by 0 days.

(21) Appl. No.: 12/084,405

(22) PCT Filed: Oct. 30, 2006

(86) PCT No.: PCT/EP2006/010416
§ 371 (c)(1),
(2), (4) Date: Mar. 16, 2009

(87) PCT Pub. No.: WO2007/051580
PCT Pub. Date: May 10, 2007

(65) Prior Publication Data
US 2009/0201799 A1   Aug. 13, 2009

(30) Foreign Application Priority Data
Oct. 31, 2005   (EP) .................................. 05077476

(51) Int. Cl.
*H04L 12/26* (2006.01)
(52) U.S. Cl. ........................................ 370/242; 370/219
(58) Field of Classification Search ................. 370/217, 370/218, 219, 220, 242, 245, 244
See application file for complete search history.

(56) References Cited
U.S. PATENT DOCUMENTS 5,253,184 A * 10/1993 Kleinschnitz ............... 702/184
5,463,634 A * 10/1995 Smith et al. ................. 714/717
5,652,908 A    7/1997 Douglas et al.
6,005,694 A * 12/1999 Liu ............................... 398/6
6,385,204 B1   5/2002 Hoefelmeyer et al.
7,349,326 B1 * 3/2008 Zadikian et al. ............. 370/216

FOREIGN PATENT DOCUMENTS
EP        0 855 842        7/1998

* cited by examiner

*Primary Examiner*—Brenda Pham
(74) *Attorney, Agent, or Firm*—Venable LLP; Keith G. Haddaway; Justine A. Gozzi

(57) ABSTRACT

One aspect of the invention comprises a method of operating a network for providing services to subscribers, the network including a configuration system comprising: a core system comprising primary and secondary cores, each core being separately capable of controlling operation of the system; at least one cell connected to the core system; and at least one network element connected to the cell, each network element supporting a number of subscribers for provision of the services; the method comprising: operating the configuration system using the primary core; monitoring operation of the primary core for a failure event preventing the primary core from properly controlling operation of the configuration system; on detection of a failure event, transferring control of operation of the configuration system to the secondary core; following correction of the failure event such that the primary core again becomes capable of properly controlling operation of the configuration system, configuring the secondary core such that it is no longer modified and synchronizing the configuration of the primary core with the configuration of the secondary core; and transferring operation of the system back to the primary core.

20 Claims, 3 Drawing Sheets

US 7,869,373 B2

HIGH-AVAILABILITY NETWORK SYSTEMS

TECHNICAL FIELD

This invention related to methods of configuring and running networks for the provision of services to subscribers, such as broadband communication networks, so as to provide high-availability of services.

BACKGROUND ART

FIG. 1 shows a generic description of a broadband network for providing telephone, internet and TV/video services to subscribers in a number of locations. A series of service providers provide the various services (SP1, SP2, SP3) to the network 10 via conventional access points 12. The network 10 provides connects these to subscribers via routers 14 located close to the subscribers. These can include business locations that can include routers in commercial property 16, and domestic subscribers with routers located in a central office 18 for a neighbourhood of separate dwellings (houses 17), or in a single building 19 such as an apartment building.

Operation of the network is controlled by a control and provisioning system 20 that configures the various elements of the network to operate in the desired manner.

For the function of the control and provisioning system 20, the network can be considered in an abstract way as comprising a core 22 having one or more cells 24, each cell having one or more network elements 26 as is shown in FIG. 2. Subscribers 28 connect to the network elements 26. This structure is not to be confused with the physical elements making up the network. The functional blocks 22, 24, 26 may be wholly or partly resident in the same or different physical elements, depending on the exact size and makeup of the network in question, although typically, each network element 26 will comprise a router.

The operator manages the network function by use of the control and provisioning system 20 which has the functions of establishing the function of each network element 26 and establishing and managing user function and operation. The primary control is effected at the level of the core 22 which defines the topology and configuration of the network, including configuring physical or logical links, assigning IP addresses and making particular service available to users connecting to the network. In an existing system, the data for configuration of the network is held in a core database accessed via an application program interface (API). On startup, the network module contains no configuration data. As and when required, for example on connection of a new device to the network module, the network module interrogates the database and caches the necessary configuration data locally where it remains until changed. When a change is made to the network configuration, the change is made to the database and an alert sent out over the network to the network modules, which in turn interrogate the database to find the changed information which is then loaded into a corresponding database in the network module where the changed data is cached (the network module database has the same basic structure as the core database but is only populated with data required to configure that network module and its associated network elements).

Since failure of part of the control and provisioning system 20 can cause failure of the whole system to provide the services to the subscribers, the use of backup or secondary systems has been proposed such that on failure of the primary system, operation is transferred to the backup so that service provision can be maintained while the problem with the primary system is addressed. Once the problem with the primary system is solved, operation is handed back from the secondary system to the primary system which then continues to operate until another problem arises. Such an approach is common in network systems.

Both the primary and secondary system include databases that are continually modified during operation. Problems can occur if changes occur in the database of an active system that are not communicated to the other system when it becomes active.

DISCLOSURE OF THE INVENTION

In the present invention, systems comprise a core system for controlling operation of the whole network, one or more cells for controlling operation of defined parts of the whole network, and network elements to which the subscribers connect (e.g. routers).

One aspect of the invention comprises a method of operating a network for providing services to subscribers, the network including a configuration system comprising:

a core system comprising primary and secondary cores, each core containing network configuration data and each core being separately capable of controlling operation of the whole network and configuration system;

at least one cell connected to the core system and capable of controlling a defined part of the network containing at least one network element connected to the cell, each network element supporting a number of subscribers for provision of the services;

the method comprising:

operating the network and the configuration system using the primary core, the network configuration data in the primary and secondary cores being periodically updated;

monitoring operation of the primary core for a failure event preventing the primary core from properly controlling operation of the network and the configuration system;

on detection of a failure event, transferring control of operation of the network and the configuration system to the secondary core;

following correction of the failure event such that the primary core again becomes capable of properly controlling operation of the network and the configuration system, configuring the secondary core such that its network configuration data is no longer modified and synchronising the network configuration data of the primary core with the network configuration data of the secondary core; and transferring operation of the network and configuration system back to the primary core.

Preferably, each core further comprises a database containing the network configuration data, the database of the primary core being continually modified during operation of the network and the configuration system, and changes to the network configuration data in the primary database being passed on to the secondary database, the method comprising, on transferring control of operation of the network and the configuration system to the secondary core, configuring the secondary database in a read-only mode so that it is not changed during the time that the secondary core controls the network and the configuration system.

Alternatively, the configuration data in the database of the primary core is continually modified during control of operation of the network and the configuration system, and changes to the network configuration data in the primary database are passed on to the secondary database, the method comprising, on transferring control of operation of the network and the configuration system to the secondary core, configuring the secondary database so that the network configuration data is continually modified during control of the network and configuration system and the step of synchronising configuration further comprising synchronising the database of the primary core with that of the secondary core.

Typically, during operation of the network and the configuration system using the primary core, the secondary core mirrors the primary core in operation such that it has a substantially identical configuration and database to those of the primary core when operation of the system is transferred to it.

Each core can include a core module element manager that monitors operation of the other core, the two element managers being linked, the step of detecting failure of the primary core comprising monitoring, by means of the element manager in the second core, the status of the link and indicating failure in the event that the link fails for more that a predetermined period of time.

Each core can also include a number of application modules, the element manager of each core controlling operation of the modules in that core. One such module is a configuration job manager for storing and updating the configuration tree containing configuration data for the whole network and relevant configuration data to a cell for the part of the network controlled by that cell.

Each cell can also comprise application modules for controlling the network in that cell. One such module comprises a configuration rendering engine for storing configuration data for the cell and deploying the configuration data for the cell into the network elements.

In a further embodiment, each cell comprises primary and secondary configuration rendering engines, each of which is capable of controlling the cell and its network elements, the method further comprising:
  providing configuration data relative to the cell from the core to both engines;
  monitoring operation of the primary engine for a failure event preventing the primary engine from properly controlling operation of the cell and its network elements;
  on detection of a failure event, transferring control of operation of the cell and its network elements to the secondary engine;
  following correction of the failure event such that the primary engine again becomes capable of properly controlling operation of the cell and its network elements, synchronising the configuration of the primary engine with the configuration of the secondary engine; and
  transferring operation of the cell and its network elements back to the primary engine.

Another aspect of the invention comprises a configuration system for providing network services to subscribers, comprising:
  a core system comprising primary and secondary cores, each core containing network configuration data and each core being separately capable of controlling operation of the whole network and configuration system;
  at least one cell connected to the core system and capable of controlling a defined part of the network containing at least one network element connected to the cell, each network element supporting a number of subscribers for provision of the services;

the primary core controlling operation the network and the configuration system in normal use;

wherein the system further comprises a monitoring system for
  detecting failure events preventing the primary core from properly controlling operation of the configuration system and, on detection of a failure event, transferring control of operation of the network and the configuration system to the secondary core;
  following correction of the failure event such that the primary core again becomes capable of properly controlling operation of the configuration system, configuring the secondary core such that it is no longer modified and synchronising the configuration of the primary core with the configuration of the secondary core; and
  transferring operation of the network and the system back to the primary core.

Each core preferably further comprises a database, the database of the primary core being continually modified during operation of the configuration system, and changes to the primary database being passed on to the secondary database, the monitoring system, on transferring control of operation of the system to the secondary core, configuring the secondary database in a read-only mode so that it is not changed during the time that the secondary core controls the system.

Alternatively, each core can further comprise a database, the database of the primary core being continually modified during control of operation of the configuration system, and the primary core operating to pass changes to the primary database on to the secondary database, the monitoring system, on transferring control of operation of the system to the secondary core, operating to configure the secondary database to be continually modified during control of the configuration system and when synchronising configuration, synchronising the database of the primary core with that of the secondary core.

During operation of the system using the primary core, it is preferred that the secondary core mirrors the primary core in operation such that it has a substantially identical configuration and database to those of the primary core when operation of the system is transferred to it.

Each core typically includes a core module element manager that monitors operation of the other core, the two element managers being linked, the element manager in the second core monitoring the status of the link and indicating failure in the event that the link fails for more that a predetermined period of time.

Each core can also include a number of application modules, the element manager of each core controlling operation of the modules in that core.

By preventing modification of the secondary core during synchronisation, loss of data during synchronisation is avoided.

In a further embodiment, each cell comprises primary and secondary configuration rendering engines, each of which is capable of controlling the cell and its network elements.

BRIEF DESCRIPTION OF THE DRAWINGS

The invention will now be described in relation to the accompanying drawings, in which.

MODEe(S) FOR CARRYING OUT THE INVENTION

Figure 1:
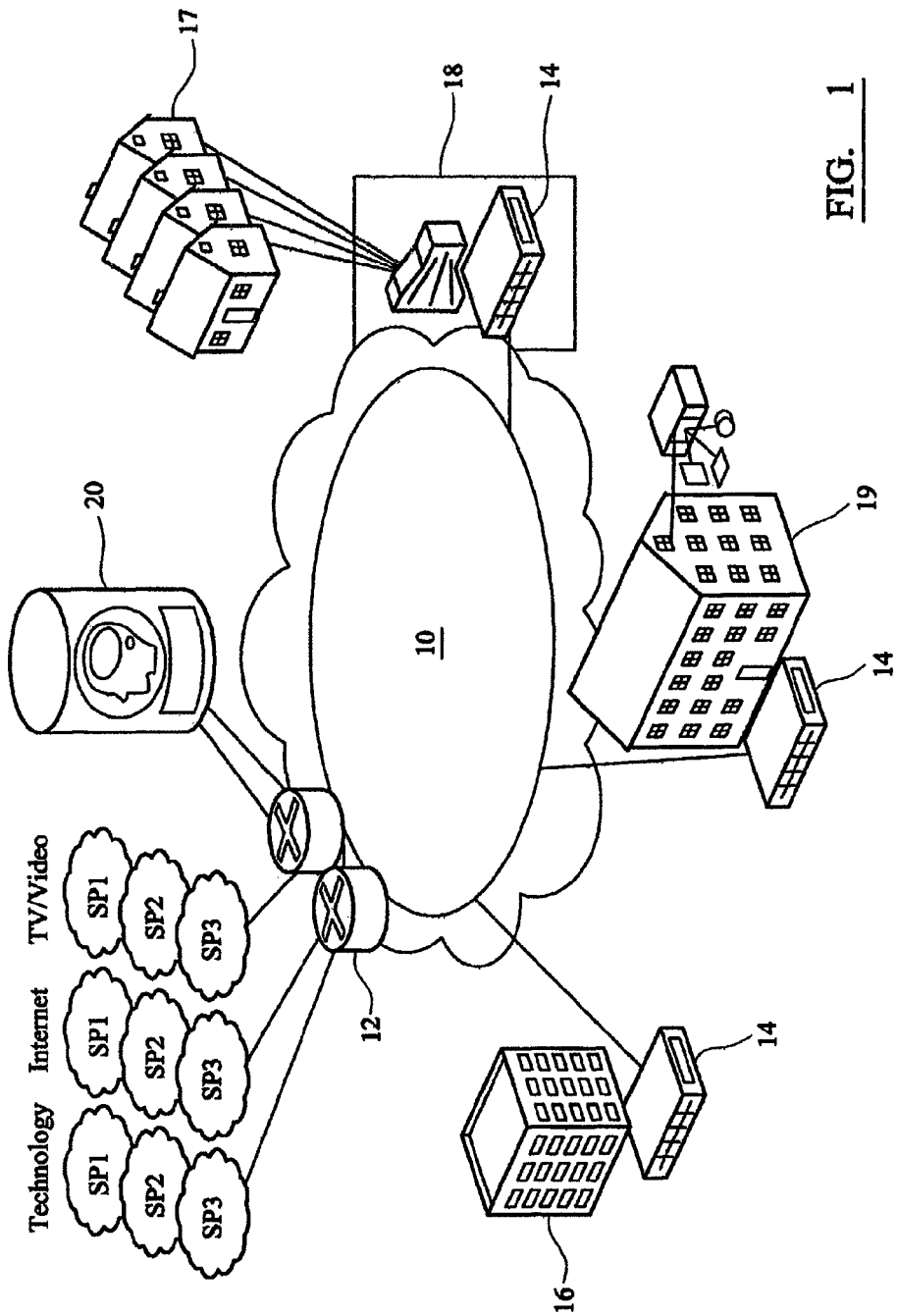
FIG. 1 shows a schematic diagram of a network to which the present invention relates.
Figure 2:
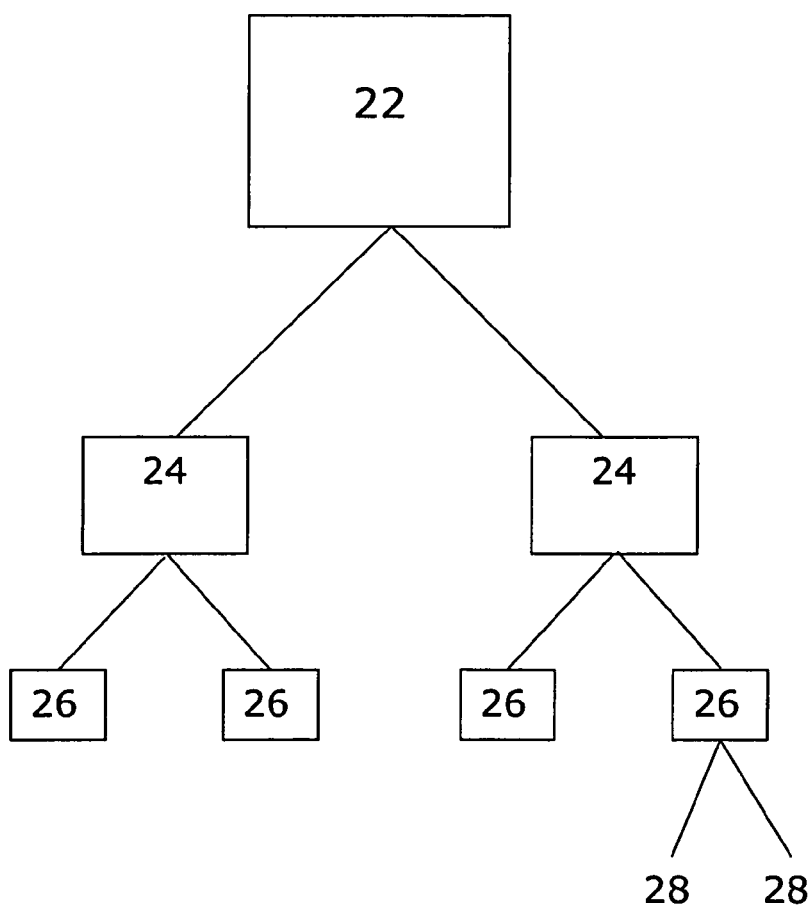
FIG. 2 shows a schematic functional view of such a network.
Figure 3:
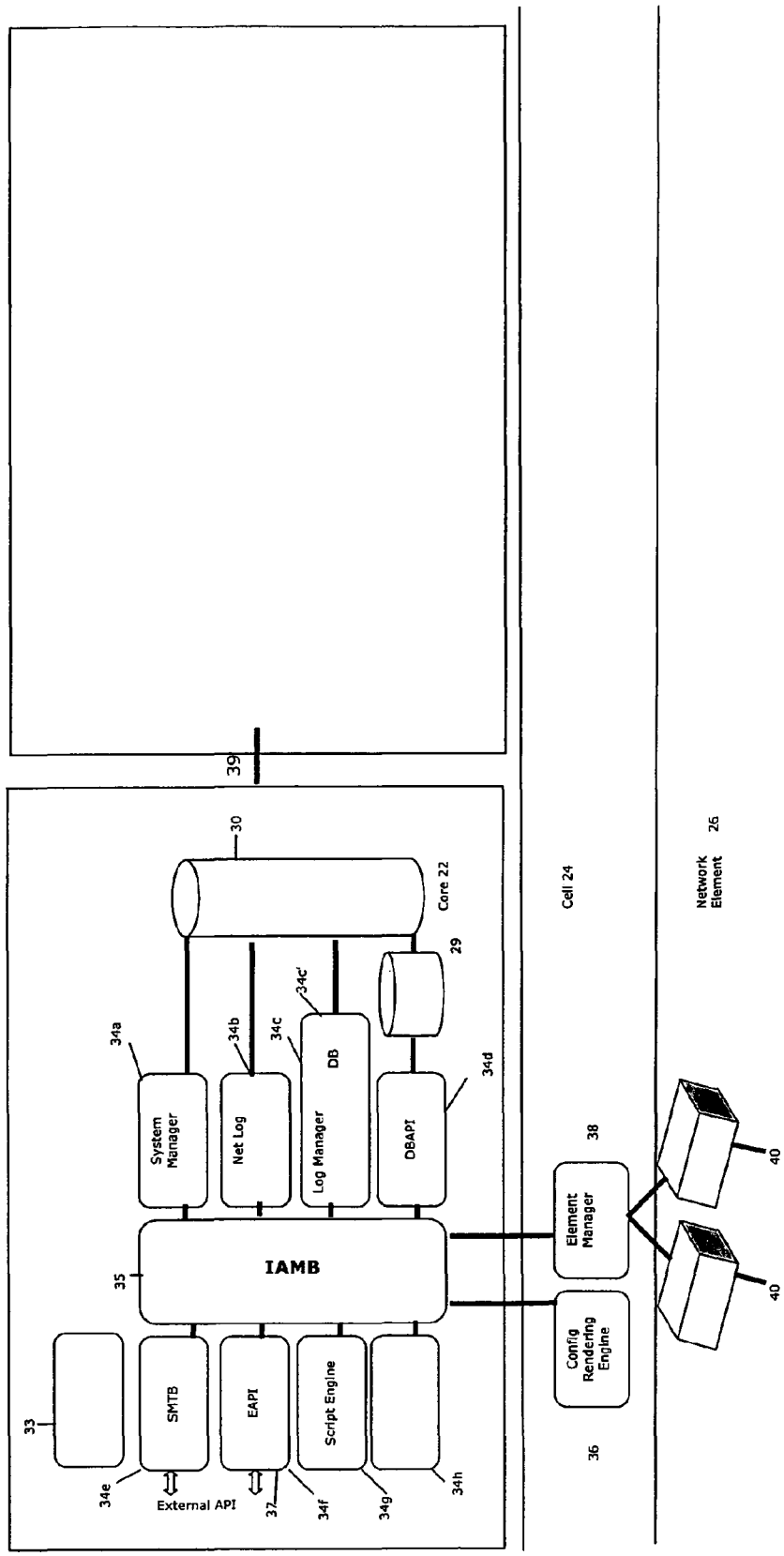
FIG. 3 shows a system for implementing a method according to the invention.

Configuration systems according to the invention comprise substantially identical primary and secondary core systems A, B which are both capable of operating to control the whole network in general, and its configuration in particular. FIG. 3 shows one such configuration system. Both the primary and secondary core systems A, B, are as shown in this figure. The core 22 comprises a file system 30, a database 32, a core module element manager 33, and a set of modules 34a-h that provide the core services for the network. The file system 30, database 32 and modules 34 are all located on a central server, although it is possible that the various components could be distributed over more than one server. The core modules 34 interact with each other, the cells 24 and network elements 26. The core 22 also interacts with external applications such as service provider systems via an external API 37. The core modules 34 comprise a system manager module 34a, a net log module 34b, a log manager module 34c, a database application interface (DBAPI) 34d, a subscriber management tool bridge (SMTB) 34e, an external application interface (EAPI) 34f, a script engine 34g, and a configuration job manager (CJM) 34h. The various core modules 34 communicate with each other via an inter-application message bus (IAMB) 35. Each cell 24 operates to control one particular part of the network and comprises modules that handle that part of the network topology in that cell. The cell 24 can be located on the same server as the core 22, but in the case of a large network, the cell 24 may be separated from the core server and deployed in the network. Each cell includes a configuration rendering engine module (CRE) 36 and an element manager module 38. Each network element 26 typically comprises a programmable router 40.

High-availability (HA) operation of the core 22 is desirable to allow the network to continue to deliver services to its existing subscribers in the event of a hardware or software problem. The core system modularity in combination with the construction of the configuration tree allow for a high level of operation.

The core module element manager 33 controls all other modules in the core, starting them with correct arguments, restarting them if they crash, and keeping information about them. It is also responsible for controlling high availability (HA) functionality in the system. It is the core module element manager 33 that decides when the secondary core B should go into active state, and controls the HA state of all modules.

In the present example, the HA setup is made up of two cores, one primary A and one secondary B. This setup is called one HA pair. Each core in a HA pair typically has the same modules (as is shown here), but the choice of modules in each HA pair can be optional.

All communication between the core module element manager 33 and other modules and between the two core module element managers in the primary and secondary cores A, B in a HA pair is done via communication channels on the IAMB 35.

Each core (primary and secondary) A, B has its own core module element manager 33. The SSD channel link 39 between these two core module element managers 33 is responsible for sharing the state between the two and detecting failure (primary goes down) or performing restoration (primary goes back to active after being down).

Failure of the primary core A is detected at the secondary core module element manager 33 when the link 39 connection is down for more than a predetermined time, for example three seconds, at which point the whole primary core A is presumed inoperable.

The core module element manager 33 on each core A, B has a connection open to each of the other modules 34 on the same core. This connection is used to send control signals between core module element manager 33 and the modules 34.

Configuration of the modules 34 is typically made through command line arguments used by the core module element manager 33 to start the modules 34 and by configuration files created when installing the control system. An alternative approach is to configure the modules 34 in the same way as the element manger 38 in the cell 24 does for network elements 26 (as is described in more detail below).

When a program is started, it connects to the core module element manager 33 on the appropriate channel.

In normal operation, both primary and secondary cores A, B are up and running, and no failover has occurred. A program running as primary will be sent an activation command when starting, and a program running as secondary will be sent a standby command. The secondary module typically only accepts connections for live updates from its primary partner.

Failover occurs when the primary core, A becomes inactive and stays inactive for more than the predetermined time. Failover does not typically occur if the secondary core B becomes inactive or if the primary core A becomes active again before the end of the predetermined time period.

On failover, the secondary modules receive activation commands and start up activity as if they were the primary core.

The restoration process is done in several steps, to ensure that the synchronisation of data from secondary B to primary A is intact.

At the beginning of restoration, a command is sent to all secondary modules to go into a read only mode and not to accept any changes. The modules return an appropriate signal when this is done. When all secondary modules have confirmed read-only mode, a message is sent to all primary modules to start synchronisation. When the primary modules are fully synchronised with the corresponding secondary module, an activation command is sent to the primary modules and a standby command is sent to the secondary modules. Normal operation is resumed.

Typical situations in which the primary core A becomes inactive and failover takes place include server hardware failure, server power failure, network device failure, network device power failure, network connectivity failure and software upgrades.

The IAMB 35 is used between modules 34 in the system and is configured to operate on all interfaces using a shortest path first algorithm to detect and establish connections over the best path between any two modules. In a typical HA-pair, the servers (i.e. cores A, B) have multiple physical interfaces. This poses a potential problem, as a problem in the network might split the network such that the servers are unable to communicate with each other, but both are able to communicate with the rest of the network. To protect against this situation, a dedicated physical link can be provided between the two servers, typically a crossed Ethernet connection with no intermediate devices directly between the Ethernet interfaces of the two servers.

The core module element manager module 33 controls the failover mechanism. The core module element manager 33 operates over IAMB 35 and maintains contact with each module 34 in the system. If a core module element loses contact with its counterpart, failover is triggered.

Data synchronisation between modules in the HA pair takes place in the following manner.

External applications connect to the system through the EAPI module 34f. The EAPI module 34f is active on both the primary and secondary server A, B. In the event that one of the servers has become inactive, the EAPI 34f for that server will be unable to respond and the session will time out. Any data created but not committed by the external application at that time will be lost. New connections must be established by the external application for restoration to work. This can either be done automatically by the application or manually by user actions.

The CJM 34h holds the entire configuration tree in memory on both core servers A, B. The active CJM 34h also provides cells 24 with updates and performs database operations. There is no active synchronisation or communication ongoing between the CJM modules on the two servers. Instead the standby CJM 34h (B) receives copies of all updates made to the external database from the DBAPI module. It then inserts these updates into its memory copy of the configuration tree which thereby is in sync with the active CJM configuration tree.

The DBAPI 34d synchronises write operations to the database 32. The standby DBAPI 34d (B) receives a copy of each write operation and makes the corresponding change to the standby database 32 (B). In addition the standby DBAPI 34d (B) sends the changes made to the database to any listening module, for example the CJM 34h (B) that listens to changes to the configuration tree table.

The system manager 34a subscribes to all files in its counterpart file repository. This ensures that each system manager 34a has all files available on its counterpart, including any operating system core images received when in failover state. Core and operating system images are synchronised during restoration.

The log manager 34c continues to operate during failover regardless of database read-only/read-write state. During normal operation the active/primary log manager 34c (A) forwards any log message written to disk to the standby/secondary log manager 34c (B). When failover occurs the standby/secondary log manager 34c (B) that now becomes active rotates the current log file. As it now is the only log manager 34c to receive logs, they are stored in a new log database file and normal log file rotation rules apply.

During restoration, the rotated log database 34c' (B) is sent to the unsynchronised log manager 34 (A). New log messages that are received during the synchronisation are written by the active log manager 34c (B) and put on the queue to the unsynchronised log manager 34c (A). The same mechanism as used to maintain synchronisation during normal operation is used. If the active log manager is the secondary log manager 34c (B), it will signal the standby/primary log manager 34c (A) when almost all logs have been transferred. The primary log manager 34c (A) then becomes active and keeps the first message to be logged in memory. The secondary log manager 34c (B) goes to standby at that point but because additional log messages may have been received, the synchronisation continues until the secondary's queue is empty. The primary/active log manager 34c (A) writes any log message it receives from the secondary until either the queue is empty or it receives the same log message as the one currently in memory (the first one logged after going active).

The net log module 34b operates the same way as the log manager module 34c, continuing to operate during a failover regardless of database read-only/read-write state. During normal operation the active/primary net log 34b (A) forwards any log message written to disk to the standby/secondary net log 34b (B). When failover occurs, the standby/secondary net log 34b (B) that now becomes active rotates the current log file. As it now is the only net log to receive logs they are stored in a new log database file. Normal log file rotation rules apply. During restoration, the rotated log database is sent to the unsynchronised net log 34b (A). New log messages that are received during the synchronisation are written by the active net log 34b (B) and put on the queue to the unsynchronised net log 34b (A). The same mechanism as used to maintain synchronisation during normal operation is used. The procedure to switchover to the correct active net log 34b is the same as for the log manager 34c.

The script engine 34g script repository is synchronised by IAMB 35. This ensures that any scripts added or modified during failover are synchronised during restoration. A script that is running when a failover event occurs will be terminated.

The SMTB module 34e has no failover state information which means that when a failover event occurs the module is merely activated on the standby server.

The failover event is triggered by the core module element manager 33 on the inactive system when it detects an abnormality in the communication with its counterpart on the active system. If all communication is lost the secondary core module element manager 33 (B) will activate all modules 34 (B). The other modules 34 (B) on the same server as the secondary core module element manager 33 (B) have already established communication with core module element manager 33 (B) on that server.

Whenever a failover occurs, the secondary server (B) takes over operation. Typically, the configuration tree database is automatically set into read-only mode. This means that it is not possible to make changes to the configuration tree. Since the configuration tree is read-only, it is no longer possible to add, change or delete any objects. This in turn means that no network elements or links can be modified and it is not longer possible to change configuration line objects or parameters. Since subscribers require service attach objects to define which services they expect, existing subscribers continue to receive their current services but the services cannot change. New subscribers cannot be added and services that expire cannot be removed. The benefit of keeping the configuration tree in read-only mode is that failover restoration is much more simple. The configuration tree database need not be synchronised once the primary server (A) is active again, which reduces restoration time. In addition, since no data is added there is no risk that information is lost should a problem occur on the secondary server (B) while the primary (A) is out of operation. No data can be lost since no data can be added. Once restoration is complete, the configuration tree is placed back in read-write mode.

Depending on the type of failure, it may not be acceptable to keep the configuration tree in read-only mode for a sustained period of time. It is therefore possible to set the configuration tree (and rest of the system) into read-write mode even when operating on the secondary server (B).

Once the system is in read-write mode, it will work as before the failover event. The key difference is that once the primary server (A) is active again, databases must be resynchronised which may take an extended period of time depending on the amount of information to exchange.

Restoration of operation is an administrative task. Once the problem with the failing server has been corrected, the server can be restarted. When the failed server (A) is active again the system administrator initiates the restoration by starting the appropriate applications. The core module element manager module 33 (B) puts the database 32 (B) into read-only mode until the modules 34 on the re-started server (A) are synchronised with their active counterparts 34 (B). The read-only mode ensures faster synchronisation as no updates to databases or file repositories are made when in read-only mode. The activation performed during synchronisation is individual to each module 34. Connections between modules 34 over the IAMB 35 are not established until the synchronisation is complete (CJM 34h to CRE 38 connection for example). When all modules 34 have reported back to the core module element manager 33 that they are in sync the core module element manager ensure that the correct modules are activated. This may mean, for example, that the EAPI module currently active 34f (B) is closed down and external applications has to reconnect to the other EAPI module 34f (A).

During restoration, the system is put back into read-only mode for the duration of the synchronisation.

The modular approach to the core 22 allows effective operation of the various functions of the core. A detailed description of the modules 34a-h follows.

The system manager module 34a maintains a central file repository in which various types of files are stored. The system manager 34a distributes the files to other parts of The system as required and serves as the aggregation point for files from other parts of the system. When the system manager 34a starts, it makes an inventory of files present in the file repository path. The system manager 34a then connects to the inter-application message bus (IAMB) 35 and starts to listen for requests. Other modules may then connect to the system manager 34a and report interest (subscribe) in files of certain types. The system manager 34a likewise subscribes to files from the connecting module.

An internal file transfer subsystem (present as a layer on top of IAMB 35) handles transfer of files matching subscription to the subscribing module. File transfer is automated by an internal file transfer subsystem. Files that are added to the file repository path are automatically detected by the subsystem which notifies the module that a new file is available. The module can then request a file transfer using the subsystem. The subsystem is used by all modules that perform file transfers with the system manager 34a.

Operating system images are required by the element manager module 38 based on the content of configuration line objects that specify which operating system image to run on any network element 40. Operating system image packages are uploaded to the system manager from a GUI.

System logging functions are provided in two modules: the net log module 34b and the log manager module 34c. While these are separate in this embodiment, they could be combined in a single module in certain cases. The net log module 34b holds the address history log and other important information related to IP address assignment to subscribers in the network.

The database files generated by net log 34b are set up to be rotated based on size and age. Whenever the maximum file size or the maximum age has been reached the log file is rotated.

The log manager module 34c holds the system log. This information relates to the operation of the system and contains information about events important in the operation of the system, including network element related actions. The log manager 34c module is also the recipient for network action request (NAR) messages and triggers automated scripts in the script engine module 34g designed to handle such events. The log manager module 34c also stores system logs in a simple database 34c' and is also responsible for a network action request event handling including calling the script engine module 34g to execute scripts that handle specific events.

System modules can generate log messages related to events and states that occur in the system. Log messages are sent over the IAMB 35. The log manager listens to the logging channels and stores received log messages into the database 34c'.

If the module becomes congested with logging information the log manager will automatically start to prioritise log messages. Lower priority log messages are dropped if the queue grows above a certain threshold. When the pressure reduces the log manager resumes storage of lower priority messages.

Network action requests (NARs) are a special event triggered by a system module. A NAR event indicates an exceptional state that requires external interaction to resolve. Examples of NAR events include IP address pool exhaustion and connection from an unknown network element. If the system is unable to resolve the situation on its own, assistance is required, either by an operator via the GUI, or by an automated script executed on the script engine module 34g. The log manager 34c listens to the NAR channel which means that it receives all NAR events. The events are stored in a separate database file that is never rotated. The event is then matched against the list of known scripts and if any matching script is found the event is sent to the script engine 34g with instructions to execute the script. When the script engine 34g reports that it has successfully handled the script the NAR event is deleted from the NAR event database.

The database application interface (DBAPI) module 34d provides database storage and access facilities for the other core modules. ODBC is used to communicate with the external database 32 that holds the configuration tree and other important data for operation of the system.

The DB-API 34d provides an abstraction layer between the system modules and the external database 32. The purpose is to make the selection of external database irrelevant for database operations by the other modules. A module that requires database access makes a connection through the DBAPI. Calls to common functions for inserting, updating and selecting from the database tables are translated from an internal system API to the ODBC call to the database.

The subscriber management tool bridge module 34e is tied to the external API 37 to allow interaction with an external subscriber management tool application (not shown).

The external application interface module 34f provides external applications, such as GUI, self-registration portals and the subscriber management tool with access to system data. The EAPI module 34f provides the application interface for external applications when communicating with the system. An example of an external application that uses the EAPI 34f is the GUI.

Other system modules with export functions to the EAPI 34f can be called by external applications. The EAPI 34f resolves the functions to be called and any parameters, verifies that all required parameters are provided and of the appropriate type and then creates a function call to the function. Functions can be internal to the EAPI or they can be located in one of the system modules. If the function is located in one of the system modules, the function is called over the IAMB 35.

The primary front-end of EAPI 34f is the SOAP/XML front-end.

The EAPI 34f contains a user authentication mechanism in which users that connect through external applications must be authentication before access is given to data and functions.

Once authenticated a session is established in which the user can access all data and functions relevant to the namespace the user belongs to.

The script engine module 34*g* provides automated script execution. During normal operation, situations may occur in which the system requires external logic to resolve the situation. An example of this is when an unknown network element attempts to contact the system. Such an element might be part of normal deployment and an automated script can create the necessary objects in the database when the element connects. The script engine module 34*g* can also provide a framework for wizards to assist in the management of the network through the GUI.

The configuration job manager (CJM) module 34*h* holds the configuration tree that describes the services available to subscribers, where in the network subscribers are present and to which services they subscribe. The configuration tree also contains network topology information including the configuration of network elements 26. The CJM 34*h* maintains the configuration tree and any changes to the tree from external applications are parsed before being deployed into the cell 24.

The CJM 34*h* is responsible for all object create, delete and update operations and contains the resource manager subsystem that handles IP address management within the system.

The CJM 34*h* connects to the DB-API module 34*d* at start-up. It then attempts to read the complete configuration tree into memory. Once completed, the CJM 34*h* waits for connections from other modules in the system. As a user views, creates, deletes or modifies objects in the configuration tree via the GUI, calls comes into the EAPI module 34*f* that are forwarded to the CJM 34*h* for object manipulation. In addition to the EAPI 34*f*, the configuration rendering engine (CRE) 36 in the cell 24 also communicates with the CJM 34*h*.

When the CRE 36 connects to the CJM 34*h* a session is established between the modules. The CRE 36 has a local copy of the configuration tree that is relevant to its position in the network. When the two modules connect they compare the version of the CRE's local copy of the configuration tree with the version currently in the CJM's memory. If they are different, the CRE 36 flushes its copy and receives a new copy from the CJM 34*h*. This ensures that the CRE 36 has the exact same copy of the configuration tree as the CJM 34*h*.

As changes to the configuration tree are received and handled by the CJM 34*h* it determines which of the CREs 36, if any, need to be updated. Updates are then sent to the relevant CRE 36.

The CJM 34*h* requires that changes to the configuration tree must be correct and possible to deploy in order to be allowed. This is controlled through the verify-commit procedure. Changes to the configuration tree, which includes create, delete and modify operation on objects, must be verified by the system modules before they can be permanently committed to the configuration tree. When the verify operation is called, the CJM 34*h* makes adjustments to the configuration tree as if the changes to the objects were included. This triggers configuration rendering and configuration verification in the cell modules, but the configuration is not actually deployed into the network. Once the verify has concluded, any errors present are reported back and an effective rollback to the preceding configuration tree occurs. If no errors are detected, the job is ready for commit. Otherwise the errors must be corrected and a new verify operation must take place.

When a commit is made the changes are permanently committed to the configuration tree (unless the job is to occur in the future, see below) and saved to the database via the DABPI, and the changes take effect immediately. The configuration is rendered and deployed into the network as required.

A resource manager subsystem of the CJM 34*h* is responsible for managing resources in the system. A typical resource is IPv4 address space used for interface addresses as well as for assignment to subscribers in the network. The system has a specific object, the Resource IPv4 object, for IP address management. The object represents a piece of the IPv4 address space and is referred to as an address pool. The name of the object is used to connect multiple objects together so that one object—the object closest to the root of the tree—represents 100 of the address pool. Other objects further down in the configuration tree branches that have the same name represent smaller parts of the main pool—up to 100 of the address pool of its immediate ancestor.

When the resource IPv4 object is created and committed to the configuration tree, the addresses of the pool it represents are allocated from its ancestor. There is an invisible ancestor representing the entire IPv4 address pool at the root node, so in fact an allocation is always made even when creating the resource object directly under the root node.

If the object does not have an ancestor (another resource IPv4 object closer to the root of the tree) the subnet and prefix length to allocate from the "global" IPv4 space must be specified. If there is an ancestor object the subnet is optional to specify when the object is created. If specified, the system will attempt to allocate the specified subnet from the ancestor resource objects pool. If the subnet is already allocated, the verify stage will fail for the new resource object. If there is an ancestor resource object, it is sufficient to specify the prefix length required for the new resource object. The system will then allocate a subnet of that size from the ancestor pool when the new object is committed to the configuration tree.

This mechanism allows a specific subnet from a pool to be specified if required, but also allows only the size of the subnet required to be specified when the actual subnet used is not important (it is up to the system to allocate the next available subnet of the requested size).

A link is a connection between two or more network elements. For an IP network, the link needs a subnet and each interface of each network element connecting to the link must also have an address. The address pool system allows links to be dynamically allocated but also makes it possible to specify the exact addresses used on each interface if required.

Operation of the core modules 34*a-h* is controlled by the core module element manager 33 which is responsible for maintaining high availability of core function by means of the backup system described in more detail below.

In the cell 24, the CRE 36 has a local copy of the configuration tree covering that part of the network covered by that cell 24. The CRE 36 assembles objects from the configuration tree to form the final configuration to be deployed into the respective network elements 40. This process includes concatenating configuration line objects and parameters, allocating IP addresses and resolving any configuration pre-processor conditions to form the final network element configuration that is passed to the element manager module 38.

The CRE 36 is a part of the cell 24. Its primary purpose is to generate the completed configuration for each type of network element 40 upper its control. The configuration is then passed on to the element manager 38 for verification and deployment. The CRE 36 is responsible for address allocation and maintains a list of all known clients.

The CRE 36 communicates with the CJM 34*h* in the core. The CJM 34H maintains the complete configuration tree for the entire network. Each CRE 36 receives a local copy of the configuration tree that describes the part of the network covered by the cell 24 (the CRE 36 does not have a complete copy of the configuration tree unless it is the only cell 24 operating). When the CRE 36 starts, it establishes a job session with the CJM 34H and receives a job id. The CJM 34H continuously verifies the job id database version used with each connected CRE 36. If the job id changes (an indication that the session has restarted, for instance due to a network problem), the CJM 34H will instruct the CRE 36 to purge its configuration tree and resend the configuration tree to the CRE 36. This allows the CRE 36 to always have the latest and accurate copy of the configuration tree.

During normal operation the CJM 34H will send updates to the configuration tree with changes to network topology, configuration updates and so on. The CRE 36 parses the changes it receives and initiates internal jobs to render the configuration.

Some jobs can be timer controlled—set to occur at a precise moment or at regular intervals. For this reason the CRE 36 operates an internal timer that can initiate internal jobs to render configuration updates.

In addition to CJM 34H initiated internal jobs, such jobs can also be started as a result of activities in the network. A typical example is when a client in the network requests and address with DHCP. An appropriate message triggers the element manager 38 to open a client context to the CRE 36 and that in turn means that the CRE 36 must render the appropriate configuration for the client, allocated IP addresses, generate network log and possible dynamic DNS updates for the client and of course send the rendered configuration to the element manger 38 for deployment.

An important function in the CRE 36 is the address assignment. Whenever a service that requires IP addresses to be assigned to clients, links or network elements are passed through the CRE 36, it will allocate the addresses used from address pools as defined by resource inet objects in the configuration tree. The CRE 36 allocates a minimum block, for example a /30 block of addresses to each network element. As client contexts are opened individual addresses from the block are allocated and inserted into the rendered configuration.

Through the EAPI 34ƒ the CRE 36 offers functions to issue and revoke tickets. A ticket is simply a named value attached to the variable. Since the ticket is bound to the client for which it is created, it can be used with condition statements in the configuration line object (CLOB) when rendering service configuration. For example, assume a ticket named weblogin that is either set or not set for the client by an external portal application. When the client connects to the network obviously there is no ticket available. In the relevant CLOB a condition can be used to render an access list that prevents access to anything but the portal for that client. When the client has accessed the portal and logged into the network, the portal application creates the client.ticket.weblogin ticket for the client (based on its IP address). The creation call through the EAPI 34ƒ to the CRE 36 creates a job update that makes the CRE 36 re-render the configuration for the client. Since the previous condition now is false, the access-list is no longer generated for the client and the client is then able to access the entire network.

The element manager module 38 is specific to each type of network element. Typically this will include an operating system that runs on the specific hardware in question. The module 38 receives configuration from CRE 36 and verifies that all configuration statements are accurate and valid for the operating system on which it is to run. Network elements 40 connect to the element manager 38 via an appropriate protocol to receive the configuration.

The system allows multiple element managers 38 for different types of network elements 40, an EM being associated with each type of operating system used by the network elements 40. The element manager for the operating system maintains communication with network elements using an appropriate protocol. The element manager 38 is part of the cell 24. It receives the configuration to deploy into the network from the CRE 36.

The system manager 34a in the core has the central file repository including all operating system images. As users upload operating system images from the GUI, the system manager 34a splits them into the actual image file and verification library file and stores them in the repository. The system manager 34a then notifies all element managers 38 about the new image which the element manager 38 then may request if it has elements 40 specified to use that image. An image requested from the system manger 34a is stored in the element manager local file repository on the cell server. Only those images present in the local file repository can be provided to network elements 40. This also means that for any operating system image upgrade to occur the image must first be uploaded to the system before network elements 40 can download the image.

Various changes can be made within the scope of the invention. For example, the cell itself can comprise a HA pair with the CRE duplicated on a second server. The CRE-primary and CRE-secondary maintain synchronisation of open contexts between them, but each receive the configuration tree and updates from the CJM in the core. Both the primary and secondary CRE have the same id on the configuration tree and if either does not match that kept in the CJM, a new copy of the configuration tree is downloaded to the cell. Any changes are queued between the primary and secondary CRE until they are again synchronised.

The invention claimed is:

1. A method of operating a network for providing services to subscribers, the method comprising:
   operating the network and a configuration system using a primary core, wherein
      the network comprises the configuration system and wherein the configuration system comprises a core system,
      the core system having the primary core and a secondary core, each core containing network configuration data and each core being separately configured to control operation of the network and the configuration system; and
   at least one cell connected to the core system and configured to control a defined part of the network containing at least one network element connected to the cell, each network element supporting a number of subscribers for provision of the services, the network configuration data in the primary and secondary cores being periodically modified;
   monitoring operation of the primary core for a failure event preventing the primary core from properly controlling operation of the network and configuration system;
   on detection of a failure event, transferring control of operation of the network and configuration system to the secondary core;
   following correction of the failure event such that the primary core again becomes configured to properly control operation of the network and configuration system, configuring the secondary core such that its network configuration data is no longer modified and synchronising the network configuration data of the primary core with the network configuration data of the secondary core; and transferring operation of the network and configuration system back to the primary core.

2. The method as claimed in claim 1, wherein each core further comprises a database containing the network configuration data, the database of the primary core being continually modified during operation of the network and the configuration system, and changes to the network configuration data in the primary database being passed on to the secondary database, the method comprising, on transferring control of operation of the network and the configuration system to the secondary core, configuring the secondary database in a read-only mode so that it is not changed during the time that the secondary core controls the network and the configuration system.

3. The method as claimed in claim 1, wherein each core further comprises a database containing the network configuration data, the database of the primary core being continually modified during control of operation of the network and the configuration system, and changes to the network configuration data in the primary database being passed on to the secondary database, the method comprising, on transferring control of operation of the network and the configuration system to the secondary core, configuring the secondary database so that the network configuration data is continually modified during control of the network and the configuration system, and the step of synchronising configuration further comprising synchronising the database of the primary core with that of the secondary core.

4. The method as claimed in claim 1, wherein, during operation of the network and the configuration system using the primary core, the secondary core minors the primary core in operation such that it has a substantially identical configuration and database to those of the primary core when operation of the system is transferred to it.

5. The method as claimed in claim 1, wherein each core includes a core module element manager that monitors operation of the other core, the two element managers being linked, the step of detecting failure of the primary core comprising monitoring, by means of the element manager in the second core, the status of the link and indicating failure in the event that the link fails for more that a predetermined period of time.

6. The method as claimed in claim 5, wherein each core includes a number of application modules, the element manager of each core controlling operation of the modules in that core.

7. The method as claimed in claim 5, wherein the core includes a configuration job manager as an application module, the method comprising storing and updating the configuration tree containing configuration data for the whole network and relevant configuration data to a cell for the part of the network controlled by that cell.

8. The method as claimed in claim 1, wherein each cell comprises application modules, the method comprising using the application modules to control the network in that cell.

9. The method as claimed in claim 8, wherein the cell comprises, as an application module, a configuration rendering engine, the method comprising storing configuration data for the cell and deploying the configuration data for the cell into the network elements.

10. The method as claimed in claim 8, wherein each cell comprises primary and secondary configuration rendering engines, each of which is capable of controlling the cell and its network elements, the method further comprising:

providing configuration data relative to the cell from the core to both engines;

monitoring operation of the primary engine for a failure event preventing the primary engine from properly controlling operation of the cell and its network elements;

on detection of a failure event, transferring control of operation of the cell and its network elements to the secondary engine;

following correction of the failure event such that the primary engine again becomes capable of properly controlling operation of the cell and its network elements, synchronising the configuration of the primary engine with the configuration of the secondary engine; and transferring operation of the cell and its network elements back to the primary engine.

11. A configuration system for providing network services to subscribers, comprising:

a core system comprising primary and secondary cores, each core containing network configuration data and each core being separately configured to control operation of the whole network and the configuration system;

at least one cell connected to the core system and configured to control a defined part of the network containing at least one network element connected to the cell, each network element supporting a number of subscribers for provision of the services;

the primary core controlling operation the network and the configuration system in normal use, the network configuration data in the primary and secondary cores being periodically modified;

wherein the system further comprises a monitoring system for detecting failure events preventing the primary core from properly controlling operation of the network and the configuration system and, on detection of a failure event, transferring control of operation of the network and the configuration system to the secondary core;

following correction of the failure event such that the primary core again becomes capable of properly controlling operation of the network and the configuration system, configuring the secondary core such that its network configuration data is no longer modified and synchronising the network configuration data of the primary core with the network configuration data of the secondary core; and transferring operation of the network and the system back to the primary core.

12. The system as claimed in claim 11, wherein each core further comprises a database containing the network configuration data, the database of the primary core being continually modified during operation of the network and the configuration system, and changes to the network configuration data in the primary database being passed on to the secondary database, the monitoring system, on transferring control of operation of the network and the configuration system to the secondary core, configuring the secondary database in a read-only mode so that it is not changed during the time that the secondary core controls the network and the configuration system.

13. The system as claimed in claim 11, wherein each core further comprises a database containing the network configuration data, the database of the primary core being continually modified during control of operation of the network and the configuration system, and the primary core operating to pass changes to the network configuration data in the primary database on to the secondary database, the monitoring system, on transferring control of operation of the network and the configuration system to the secondary core, operating to configure the secondary database so that the network configuration data is continually modified during control of the network and the configuration system and when synchronising configuration, synchronising the database of the primary core with that of the secondary core.

14. The system as claimed in claim 11, wherein, during operation of the network and the configuration system using the primary core, the secondary core minors the primary core in operation such that it has a substantially identical configuration and database to those of the primary core when operation of the network and the configuration system is transferred to it.

15. The system as claimed in claim 11, wherein each core includes a core module element manager that monitors operation of the other core, the two element managers being linked, the element manager in the second core monitoring the status of the link and indicating failure in the event that the link fails for more that a predetermined period of time.

16. The system as claimed in claim 15, wherein each core includes a number of application modules, the element manager of each core controlling operation of the modules in that core.

17. The system as claimed in claim 16, wherein the core includes a configuration job manager as an application module for storing and updating the configuration tree containing configuration data for the whole network and relevant configuration data to a cell for the part of the network controlled by that cell.

18. The system as claimed in claim 11, wherein each cell comprises application modules for controlling the network in that cell.

19. The system as claimed in claim 18, wherein the cell comprises, as an application module, a configuration rendering engine for storing configuration data for the cell and deploying the configuration data for the cell into the network elements.

20. The system as claimed in claim 19, wherein each cell comprises primary and secondary configuration rendering engines, each of which is capable of controlling the cell and its network elements.

* * * * *